Feb. 19, 1946.   E. M. CURRIE   2,395,254
APPARATUS FOR THE DETERMINATION OF THE FLUIDITY OF MOLTEN METALS
Filed June 2, 1945
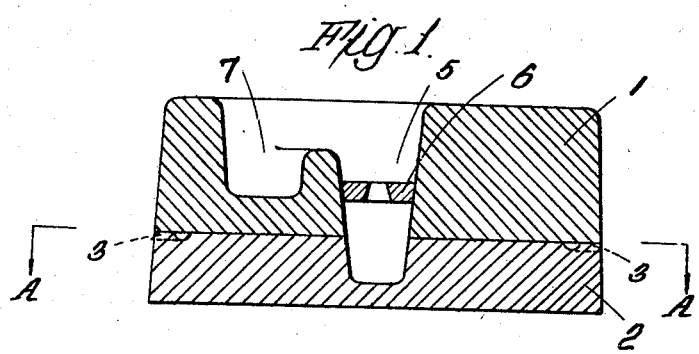
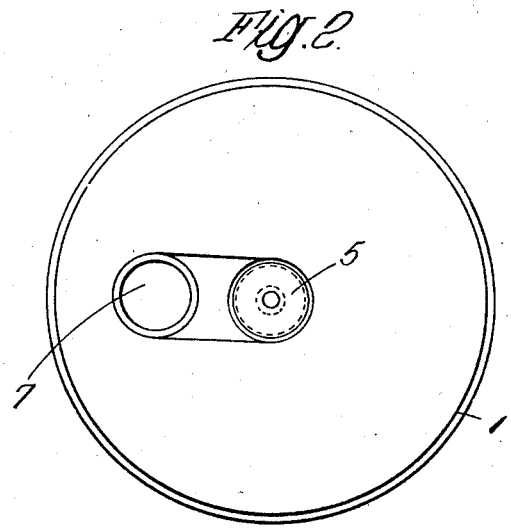
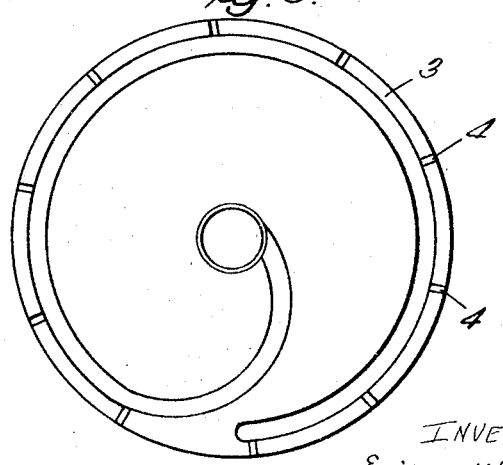
INVENTOR
Eric Milton Currie
ATTORNEYS
Hoadling and Krost Patented Feb. 19, 1946

2,395,254

UNITED STATES PATENT OFFICE 2,395,254

APPARATUS FOR THE DETERMINATION OF THE FLUIDITY OF MOLTEN METALS

Eric Milton Currie, London, England, assignor to The International Meehanite Metal Company Limited, London, England Application June 2, 1945, Serial No. 597,296
In Great Britain August 18, 1944

2 Claims. (Cl. 73—432)

This invention relates to an apparatus for the determination of the fluidity of molten metal. The necessity of obtaining an approximate measurement of the fluidity of iron in order to determine its suitability for a given section is obvious to any practical foundryman. A detailed study of defective castings records will bear ample testimony to the fact that many castings are lost simply because the metal or alloy poured into the mould was not in a condition suitable for running thin sections or could not be cleansed of contaminated foreign matter picked up in the process of casting.

On investigation it is not unusual to find that the metal melted hot, and appeared to be hot enough in the ladle, and that in consequence those responsible felt justified in proceeding with the cast, an explanation which, through it sounds plausible, gives but little satisfaction for uniform castings.

Composition, metal temperature and purity are the main factors affecting fluidity but these are always under strict control and can be measured easily whilst in the ladle, hence the desirability of instituting a quick and practical test which may be carried out "on the job" immediately prior to casting is clearly indicated. The fluidity test is in effect a measure of the efficiency under which melting practice is carried out, for if properly used it may bring to light many of the shortcomings relating to furnace, mixture and composition and purity not readily discernible by any other means.

The standard spiral fluidity test has been in use for a number of years but is not entirely satisfactory. Results have been inconsistent and there is, of course, a time lag between casting the test piece and determining the length of the spiral. This time lag is a factor which must be reckoned with when a considerable number of hand ladles are being fed from the same holding ladle, since it is possible that between the time of casting the test pieces and determining the length of the spiral many shanks may have been filled with metal and the metal poured into moulds.

It is an object of the present invention to provide an apparatus for carrying out an improved fluidity test which eliminates the undesirable time lag and which gives a prompt and usable reading.

Accordingly, the present invention provides an apparatus for the determination of the fluidity of molten metals and alloys, particularly ferrous metals, comprising a reservoir for the molten metal to be tested, a spiral runway connected thereto, said spiral runway having a plurality of outlets to indicate the degree of fluidity of the metal.

The invention will now be further described by way of example with reference to the accompanying drawing, in which:

Fig. 1 is a longitudinal sectional view of an apparatus according to the invention, Fig. 2 is a top plan view of the apparatus, and Fig. 3 is a plan view taken on the line A—A of Fig. 1.

Referring to the drawing, the test piece is formed in a mould comprising two oil sand cores 1 and 2. The lower half 2 of the mould contains a spiral runway 3 having a plurality, for example ten or more, radial outlets 4 and the upper half 1 of the mould contains a pouring basin 5 and strainer core 6. The metal is not poured directly on top of the strainer core but into a well 7 at the side, thus allowing greater ease for the pouring basin to be kept full. The strainer core is set well below the top of the outlet from the pouring basin so as to allow for a reasonably constant liquid static head above the strainer. The two halves of the core are held together by weights or by means of a simple clamp (not shown in the drawing).

The metal passes from the well beneath the strainer core to the spiral runway 3 concentric with the outside wall of the core and at regular intervals the holes 4 radiate from the spiral to the outside of the core. These holes provide the means of determining, without stripping the core, how far the metal has run in the concentric spiral, since it will obviously flow out of each hole in turn as it travels around the spiral. It only remains therefore to decide out of how many holes the metal must flow in order to be suitable for a given metal section. Thus it may be that to run a given section it is required that the metal shall flow out of four holes. With this knowledge tests are taken frequently during casting and immediately the number of holes through which the metal flows falls below four, casting is stopped and the metal returned or put into thicker section work.

The apparatus may be used with all the outlets open but in general the correct outlet number will be determined according to the section to be cast and then all the outlets up to this number should be closed up. If the metal runs as far as this outlet, then the castings are fit to be poured in the metal from the ladle. If not, it is either poured down or else used for thicker castings which it will run perfectly. In other words, it represents a metal fluidity (composition of metal, purity and temperature) pouring control test.

It will be understood that provisions may also be made for altering the sizes and length of the runway and number of outlets for either more fluid or less fluid metals.

The runway can be lengthened by making one or more spirals in the mould between the bottom of the pouring basin and the outer measuring ring. A thicker runway and larger outlets and a larger hole in the small core in the downgate will provide for more sluggish metals.

While the invention has been mainly described with reference to ferrous metals it will be understood that the apparatus can be used with non-ferrous metals.

While the spiral runway has been described as being in the lower part of the mould as is preferred, it will be understood that it may be in the upper part if desired.

I claim:

1. An apparatus for the determination of the fluidity of molten metals and alloys which comprises a reservoir for the molten metal to be tested, a spiral runway connected to said reservoir, said spiral runway having a plurality of outlets therein to indicate a degree of fluidity of the metal.

2. An apparatus for the determination of the fluidity of molten metals and alloys which comprises a mould comprising two sand cores, a spiral runway in the lower half of said mould, said spiral runway having a plurality of radial outlets therein to indicate the degree of fluidity of the metal, a pouring basin and strainer core in the upper half of the mould and a well at the side of the strainer core for pouring the metal.

ERIC MILTON CURRIE.